US012661784B2

(12) United States Patent
Wang et al.

(10) Patent No.: US 12,661,784 B2
(45) Date of Patent: Jun. 23, 2026

(54) METHOD AND APPARATUS FOR CONTROLLING WHEEL-LEGGED ROBOT

(71) Applicant: Tencent Technology (Shenzhen) Company Limited, Shenzhen (CN)

(72) Inventors: Shuai Wang, Shenzhen (CN); Jingfan Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 370 days.

(21) Appl. No.: 18/232,912

(22) Filed: Aug. 11, 2023

(65) Prior Publication Data

US 2023/0381964 A1 Nov. 30, 2023

Related U.S. Application Data

(63) Continuation of application No. PCT/CN2022/136789, filed on Dec. 6, 2022.

(30) Foreign Application Priority Data

Mar. 11, 2022 (CN) .......................... 202210238633.0

(51) Int. Cl.
*B25J 13/08* (2006.01)
*B25J 9/16* (2006.01)
*B62D 57/028* (2006.01)

(52) U.S. Cl.
CPC ........... *B25J 9/1664* (2013.01); *B25J 13/085* (2013.01); *B25J 13/089* (2013.01); *B62D 57/028* (2013.01)

(58) Field of Classification Search
CPC ...... B25J 9/1664; B25J 13/089; B25J 13/085; B62D 57/028
See application file for complete search history.

(56) References Cited

U.S. PATENT DOCUMENTS 11,478,934 B2 * 10/2022 Sato ...................... B25J 19/063
12,103,160 B2 * 10/2024 Kawaguchi .......... B25J 15/0009
(Continued)

FOREIGN PATENT DOCUMENTS

| AU | 2019101190 A4 | 1/2020 |
| CN | 2673583 Y | 1/2005 |

(Continued)

OTHER PUBLICATIONS

Office Action in Chinese Application No. 202210238633.0, dated May 15, 2024, 13 pages (with English translation).
(Continued)

*Primary Examiner* — Dalena Tran
(74) *Attorney, Agent, or Firm* — Crowell & Moring LLP

(57) ABSTRACT

A method and apparatus for controlling a wheel-legged robot are provided. The method includes: controlling a first wheel leg to move from a first step onto a second step, controlling a second wheel leg and an auxiliary wheel leg to be stabilized on the first step; controlling the second wheel leg to move from the first step onto the second step, controlling the first wheel leg to be stabilized on the second step, and controlling the auxiliary wheel leg to be stabilized on the first step; and controlling the auxiliary wheel leg to move from the first step onto the second step, and controlling the first wheel leg and the second wheel leg to be stabilized on the second step.

20 Claims, 10 Drawing Sheets

(56) References Cited

U.S. PATENT DOCUMENTS

| | | | | |
|---|---|---|---|---|
| 2006/0243499 A1* | 11/2006 | Hosoda | ............... | B62D 57/028 |
| | | | | 180/8.5 |
| 2021/0016450 A1* | 1/2021 | Fan | .......................... | A61H 1/00 |
| 2025/0145233 A1* | 5/2025 | Kamon | ............... | B62D 57/028 |

FOREIGN PATENT DOCUMENTS

| | | | |
|---|---|---|---|
| CN | 107021146 A | 8/2017 |
| CN | 107933729 A | 4/2018 |
| CN | 109434795 A | 3/2019 |
| CN | 109589215 A | 4/2019 |
| CN | 111776106 A | 10/2020 |
| CN | 112519914 A | 3/2021 |
| CN | 213384508 U | 6/2021 |
| CN | 214215975 U | 9/2021 |
| CN | 214493142 U | 10/2021 |
| CN | 113753150 A | 12/2021 |
| JP | S 60-219170 A | 11/1985 |
| JP | H 0592779 A | 4/1993 |
| JP | 2006-190105 A | 7/2006 |
| JP | 2009-090795 A | 4/2009 |

OTHER PUBLICATIONS

International Search Report issued Feb. 23, 2023 in corresponding International PCT Application No. PCT/CN2022/136789.

English-language Search Report issued in European Application No. 22930638.6 dated Apr. 24, 2025 (8 pages).

Japanese-language Office Action issued in Japanese Application No. 2024-553167 dated Aug. 5, 2025, with English translation (7 pages).

\* cited by examiner

Wireless network or wired network 200     200

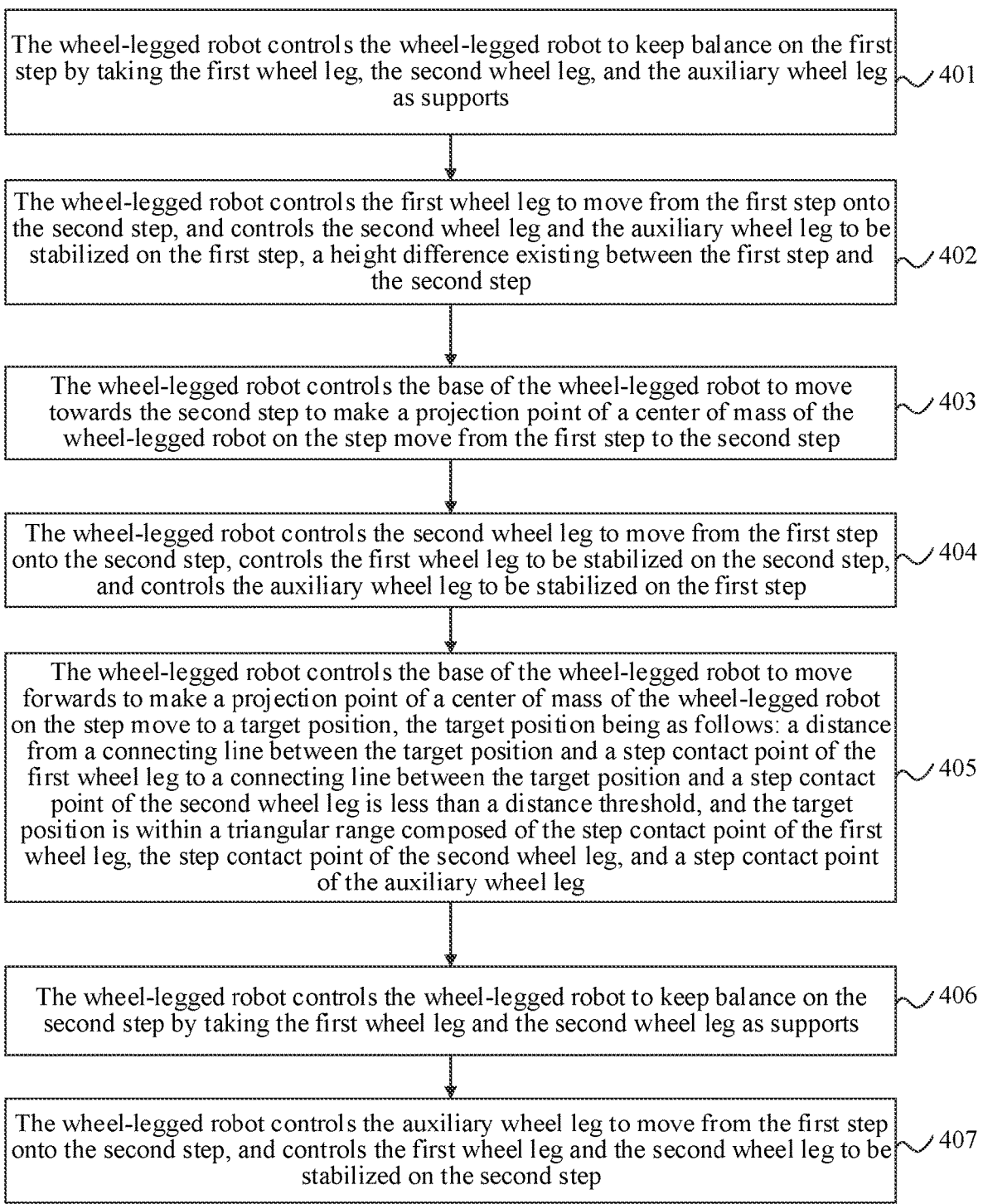

The wheel-legged robot controls the wheel-legged robot to keep balance on the first step by taking the first wheel leg, the second wheel leg, and the auxiliary wheel leg as supports ⟶ 401

The wheel-legged robot controls the first wheel leg to move from the first step onto the second step, and controls the second wheel leg and the auxiliary wheel leg to be stabilized on the first step, a height difference existing between the first step and the second step ⟶ 402

The wheel-legged robot controls the base of the wheel-legged robot to move towards the second step to make a projection point of a center of mass of the wheel-legged robot on the step move from the first step to the second step ⟶ 403

The wheel-legged robot controls the second wheel leg to move from the first step onto the second step, controls the first wheel leg to be stabilized on the second step, and controls the auxiliary wheel leg to be stabilized on the first step ⟶ 404

The wheel-legged robot controls the base of the wheel-legged robot to move forwards to make a projection point of a center of mass of the wheel-legged robot on the step move to a target position, the target position being as follows: a distance from a connecting line between the target position and a step contact point of the first wheel leg to a connecting line between the target position and a step contact point of the second wheel leg is less than a distance threshold, and the target position is within a triangular range composed of the step contact point of the first wheel leg, the step contact point of the second wheel leg, and a step contact point of the auxiliary wheel leg ⟶ 405

The wheel-legged robot controls the wheel-legged robot to keep balance on the second step by taking the first wheel leg and the second wheel leg as supports ⟶ 406

The wheel-legged robot controls the auxiliary wheel leg to move from the first step onto the second step, and controls the first wheel leg and the second wheel leg to be stabilized on the second step ⟶ 407

FIG. 4

Front view                    Side view

Three-dimensional
view                          Top view

Front view          Side view

Three-
dimensional view          Top view

Front view          Side view

Three-
dimensional view          Top view

Front view            Side view

Three-dimensional view            Top view

Front view            Side view

Three-dimensional view            Top view

Front view             Side view

Three-dimensional view            Top view

METHOD AND APPARATUS FOR CONTROLLING WHEEL-LEGGED ROBOT

RELATED APPLICATION

This application is a continuation application of PCT Patent Application No. PCT/CN2022/136789, filed on Dec. 6, 2022, which claims priority to Chinese Patent Application 202210238633.0, entitled "METHOD AND APPARATUS FOR CONTROLLING WHEEL-LEGGED ROBOT, ROBOT, AND STORAGE MEDIUM" filed with the China National Intellectual Property Administration on Mar. 11, 2022, wherein the content of the above-referenced applications is incorporated herein by reference in its entirety.

FIELD OF THE TECHNOLOGY

This disclosure relates to the field of robots, and in particular, to a method and apparatus for controlling a wheel-legged robot, a robot, and a storage medium.

BACKGROUND OF THE DISCLOSURE

A wheel-legged robot is a robot that controls the motion of a robot main body through a wheel-legged structure. The agility and flexibility of the wheel-legged robot in ground motion have attracted widespread attention of researchers. How to control the wheel-legged robot to achieve more actions is currently a main research direction.

SUMMARY

This disclosure provide a method and apparatus for controlling a wheel-legged robot, a robot, and a storage medium.

One aspect of the disclosure provides a method for controlling a wheel-legged robot, the wheel-legged robot including a first wheel leg, a second wheel leg, and an auxiliary wheel leg, and the method including:

controlling the first wheel leg to move from a first step onto a second step;

controlling the second wheel leg and the auxiliary wheel leg to be stabilized on the first step, a height difference existing between the first step and the second step;

controlling the second wheel leg to move from the first step onto the second step;

controlling the first wheel leg to be stabilized on the second step;

controlling the auxiliary wheel leg to be stabilized on the first step;

controlling the auxiliary wheel leg to move from the first step onto the second step; and controlling the first wheel leg and the second wheel leg to be stabilized on the second step.

Another aspect of the disclosure provides an apparatus for controlling a wheel-legged robot, the wheel-legged robot including a first wheel leg, a second wheel leg, and an auxiliary wheel leg, and the apparatus including: a memory operable to store computer-readable instructions and a processor circuitry operable to read the computer-readable instructions. When executing the computer-readable instructions, the processor circuitry is configured to control the first wheel leg to move from a first step onto a second step;

control the second wheel leg and the auxiliary wheel leg to be stabilized on the first step, a height difference existing between the first step and the second step;

control the second wheel leg to move from the first step onto the second step;

control the first wheel leg to be stabilized on the second step;

control the auxiliary wheel leg to be stabilized on the first step;

control the auxiliary wheel leg to move from the first step onto the second step; and control the first wheel leg and the second wheel leg to be stabilized on the second step.

Another aspect of the disclosure provides a non-transitory machine-readable media, having instructions stored on the machine-readable media to control a wheel-legged robot. The wheel-legged robot comprises a first wheel leg, a second wheel leg, and an auxiliary wheel leg. When being executed, the instructions are configured to cause a machine to:

control the first wheel leg to move from a first step onto a second step;

control the second wheel leg and the auxiliary wheel leg to be stabilized on the first step, a height difference existing between the first step and the second step;

control the second wheel leg to move from the first step onto the second step;

control the first wheel leg to be stabilized on the second step;

control the auxiliary wheel leg to be stabilized on the first step;

control the auxiliary wheel leg to move from the first step onto the second step; and control the first wheel leg and the second wheel leg to be stabilized on the second step.

BRIEF DESCRIPTION OF THE DRAWINGS

FIG. 4 is a flowchart of a method for controlling a wheel-legged robot provided according to an embodiment of this disclosure.

DESCRIPTION OF EMBODIMENTS

To make the objectives, technical solutions, and advantages of this disclosure clearer, the following further describes implementations of this disclosure in detail with reference to the accompanying drawings.

The terms "first", "second", and the like used in this disclosure are used for distinguishing identical or similar items that have essentially the same effects and functions. It should be understood that there is no logical or temporal dependency relationship between "first", "second", and "nth", and there is no limitation on quantities and execution orders.

The solutions provided in this disclosure mainly involve a robot technology. A robot is a mechanical and electronic device that is a combination of mechanical transmission and a modern microelectronics technology to imitate a certain skill of a person. With the development of the technology, robots have been greatly improved in terms of functionality and technical level. Mobile robots and visual and tactile technologies of the robots are typical representatives.

Wheel-legged robot: A wheel-legged robot is a robot that controls the motion of the robot through a wheel-legged structure. It has extremely high wheel energy and extremely strong adaptability and can adapt to uneven terrains. The wheel-legged structure includes two parts: a leg containing at least one joint; and a wheel. Due to the fact that wheel-legged robots only contact the ground through wheels of their wheel legs, there is often a problem of balance control.

Figure 1:
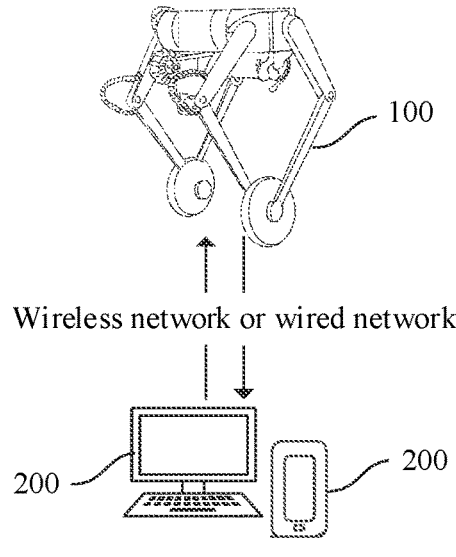
FIG. 1 is a schematic diagram of an implementation environment of a method for controlling a wheel-legged robot provided according to an embodiment of this disclosure.

The following describes an implementation environment of this disclosure. FIG. 1 is a schematic diagram of an implementation environment of a method for controlling a wheel-legged robot provided in the embodiments of this disclosure. Referring to FIG. 1, the implementation environment includes a wheel-legged robot 100 and a control device 200. The wheel-legged robot 100 and the control device 200 are connected to each other through a wired or wireless network.

Figure 2:
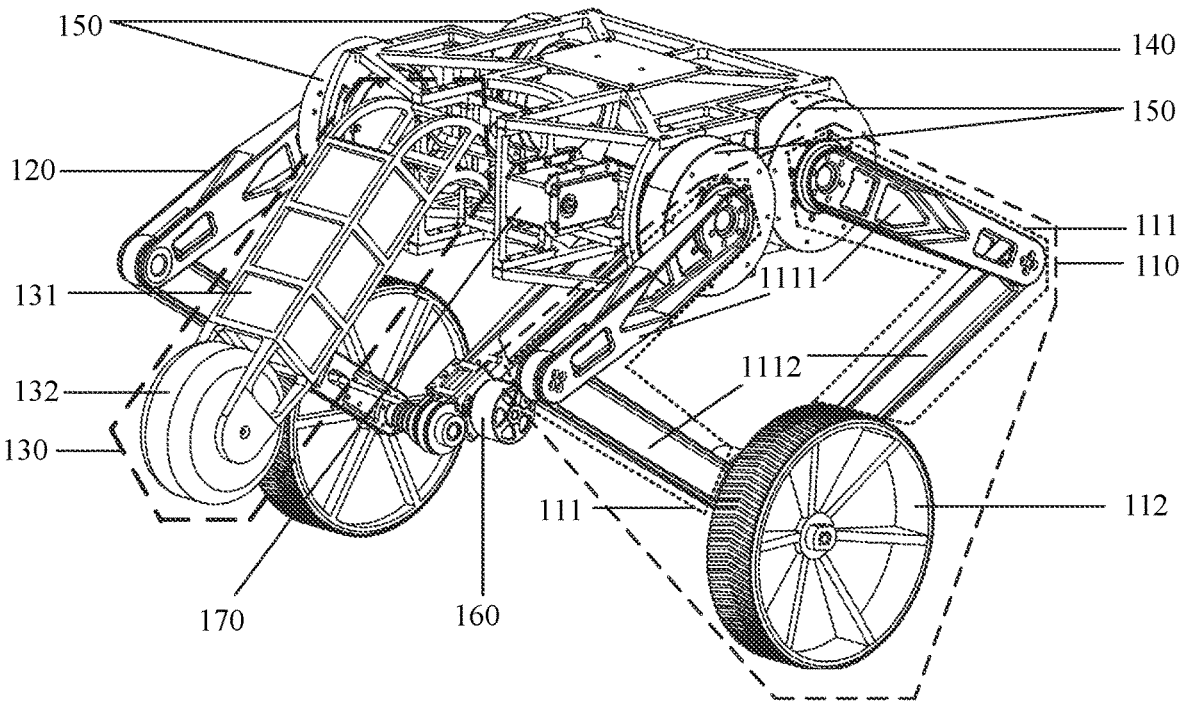
FIG. 2 is a schematic structural diagram of a wheel-legged robot provided according to an embodiment of this disclosure.

In the embodiments of this disclosure, the structure of the wheel-legged robot 100 is as shown in FIG. 2. The wheel-legged robot 100 includes a first wheel leg 110, a second wheel leg 120, an auxiliary wheel leg 130, and a base 140. The base 140 is located above the first wheel leg 110, the second wheel leg 120, and the auxiliary wheel leg 130 and is connected to the first wheel leg 110, the second wheel leg 120, and the auxiliary wheel leg 130.

The first wheel leg 110 and the second wheel leg 120 are configured to drive the robot to move. The structure of the first wheel leg 110 and the structure of the second wheel leg 120 are the same. An explanation will be made below by taking the first wheel leg 110 as an example. As shown in FIG. 2, the first wheel leg 110 includes two leg structures 111 and a wheel 112. The two leg structures 111 are connected to the wheel 112. Each of the two leg structures 111 includes a thigh structure 1111 and a lower leg structure 1112, that is, the first wheel leg 110 includes two thigh structures 1111 and two lower leg structures 1112. Each thigh structure 1111 and one matching lower leg structure 1112 are connected through a rotational joint. Each of the two leg structures 111 is associated with one first motor 150, and each first motor 150 is connected to the thigh structure 1111 in the associated leg structure 111 and is configured to control the associated leg structure 111 to extend and retract. That is, the first wheel leg 110 is controlled by the two first motors 150, and the two thigh structures 1111 of the first wheel leg 110 are respectively connected to the base 140 through output shafts of the respective associated first motors 150. The wheel 112 is a driving wheel. The wheel 112 can be driven by a second motor 160 to actively rotate, thereby controlling the wheel-legged robot 100 to perform designated actions, such as: controlling the wheel-legged robot to move forwards, controlling the wheel-legged robot to move backwards, controlling the wheel-legged robot to turn, controlling the wheel-legged robot to stand still, or the like. For example, the second motor 160 is fixed on one lower leg structure 1112 of the first wheel leg 110 to drive a rotating shaft of the wheel 112 (namely, the driving wheel) through belt transmission, to drive the driving wheel.

The auxiliary wheel leg 130 is configured to assist the wheel-legged robot in maintaining balance, so that the wheel-legged robot can complete complex actions such as going upstairs. As shown in FIG. 2, the auxiliary wheel leg 130 includes an auxiliary wheel leg 131 and an auxiliary wheel 132. The auxiliary wheel leg 131 is connected to the base 140 through an output shaft of a third motor 170. The third motor 170 is configured to control the auxiliary wheel leg 130 to swing up and down relative to the base. The auxiliary wheel 132 is a driven wheel. When the auxiliary wheel leg 130 contacts the ground, the auxiliary wheel 132 can roll on the ground as the wheel-legged robot 100 moves.

The wheel-legged robot 100 also includes hardware structures such as a central processing unit and a battery. In an exemplary embodiment, the central processing unit and the battery are mounted in the base 140. The central processing unit is configured to control the wheel-legged robot to perform various actions. In an exemplary embodiment, the central processing unit is an independent hardware structure, or the wheel-legged robot includes a microcomputer. The central processing unit is integrated into the microcomputer.

The control device 200 is a terminal or a remote controller. The terminal includes a smartphone, a tablet, a laptop, a desktop computer, and the like. The embodiments of this disclosure do not limit this. In some embodiments, the control device 200 is configured to send a control command to the wheel-legged robot 100 to control the wheel-legged robot 100 to perform actions indicated by the control command.

Figure 3:
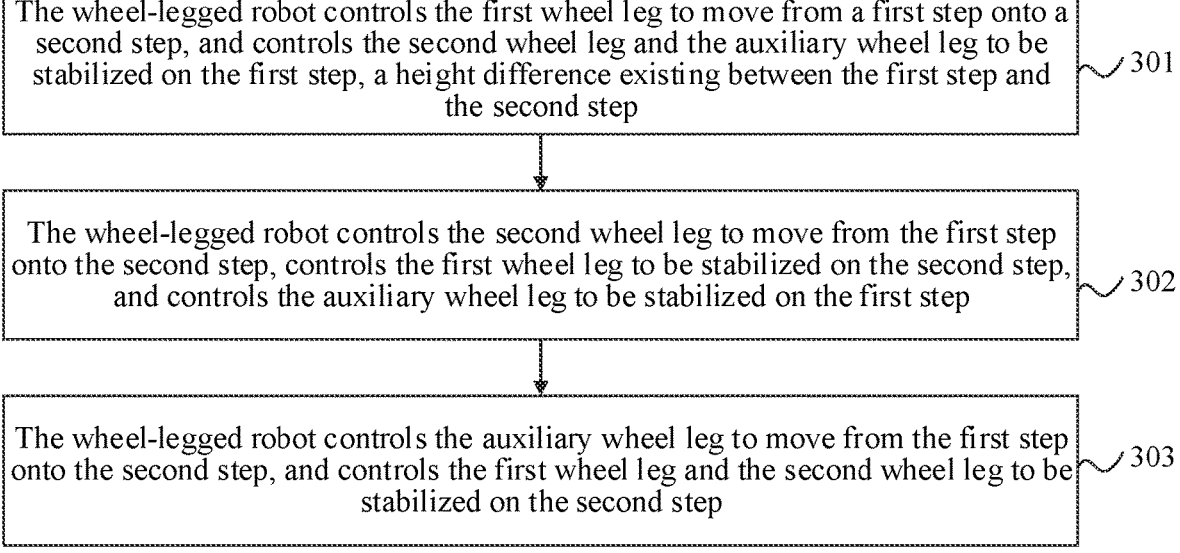
FIG. 3 is a flowchart of a method for controlling a wheel-legged robot provided according to an embodiment of this disclosure.

Based on the implementation environment shown in FIG. 1, FIG. 3 is a flowchart of a method for controlling a wheel-legged robot provided according to an embodiment of this disclosure. The method is performed by a central processing unit of the wheel-legged robot. As shown in FIG. 3, this embodiment includes the following steps.

301: The wheel-legged robot controls the first wheel leg to move from a first step onto a second step, and controls the second wheel leg and the auxiliary wheel leg to be stabilized on the first step, a height difference existing between the first step and the second step.

In the embodiments of this disclosure, the second step is higher than the first step. That is, the process that the first wheel leg moves from the first step to the second step is a process that the wheel-legged robot performs an action of going upstairs.

In some embodiments, the central processing unit first controls the wheel-legged robot to keep balance on the first step by taking the above three wheel legs as supports, and then controls one wheel leg to move and the other two wheel legs to remain stationary, so that the wheel-legged robot can keep balance in the process that the wheel-legged robot performs the action of going upstairs.

302: The wheel-legged robot controls the second wheel leg to move from the first step onto the second step, controls the first wheel leg to be stabilized on the second step, and controls the auxiliary wheel leg to be stabilized on the first step.

303: The wheel-legged robot controls the auxiliary wheel leg to move from the first step onto the second step, and controls the first wheel leg and the second wheel leg to be stabilized on the second step.

In some embodiments, for steps 301 to 303 above, the wheel-legged robot controls the above three wheel legs on the basis of step information, so as to control the wheel-legged robot to perform the action of going upstairs. The step information is used for describing features of the steps and a position of the wheel-legged robot relative to the steps, and includes widths of the steps, the height difference between the first step and the second step, a distance between the wheel-legged robot and the first step or the second step, and the like.

In an exemplary embodiment, the wheel-legged robot obtains the step information in two ways. In one implementation, a skilled person sends a control command to the wheel-legged robot through the control device. The control command carries the step information. The central processing unit of the wheel-legged robot receives the control command and obtains the step information carried by the control command. In another implementation, the wheel-legged robot is provided with an image acquisition sensor. The image acquisition sensor may acquire an image containing the first step and the second step. The wheel-legged robot acquires the step information on the basis of the image acquired by the image acquisition sensor.

According to the technical solutions provided by the embodiments of this disclosure, the first wheel leg, the second wheel leg, and the auxiliary wheel leg are controlled to move from the first step to the second step in sequence, and the other two wheel legs are controlled to be stabilized on the step when moving any wheel leg, so that in a case of ensuring the balance of the wheel-legged robot, the function of the wheel-legged robot for going upstairs is realized, the diversity of actions and functions of the wheel-legged robot is improved, and the adaptability of the wheel-legged robot to the ground is also improved.

The embodiments provided in FIG. 3 above briefly describe the method for controlling the wheel-legged robot provided in this disclosure. Based on the implementation environment shown in FIG. 1 and the wheel-legged robot described in FIG. 2, the method will be described in detail below in conjunction with FIG. 4. FIG. 4 is a flowchart of a method for controlling a wheel-legged robot provided according to an embodiment of this disclosure. The embodiments of this disclosure are explained by taking the following as an example: the wheel-legged robot obtains step information on the basis of an image acquisition sensor. As shown in FIG. 4, the method is performed by the wheel-legged robot, and includes the following steps.

401: The wheel-legged robot controls the wheel-legged robot to keep balance on the first step by taking the first wheel leg, the second wheel leg, and the auxiliary wheel leg as supports.

In an exemplary embodiment, the wheel-legged robot controls the first wheel leg, the second wheel leg, and the auxiliary wheel leg to remain stationary on the first step, or adjusts the first wheel leg, the second wheel leg, and the auxiliary wheel leg to a stable state. The process of adjusting the three wheel legs to the stable state will be described below.

In some embodiments, the wheel-legged robot controls the base of the wheel-legged robot to move downwards, so that the auxiliary wheel leg connected to the base contacts the first step, and controls a projection point of a center of mass of the wheel-legged robot on the step to be within a triangular range composed of a step contact point of the first wheel leg, a step contact point of the second wheel leg, and a step contact point of the auxiliary wheel leg.

Exemplarily, the process of controlling the base to move downwards will be explained. The wheel-legged robot obtains a distance between the auxiliary wheel leg and the first step on the basis of the image sent by the image acquisition sensor; obtains, on the basis of the distance between the auxiliary wheel leg and the first step and a wheel leg moving direction indicated by a retraction action, a target joint torque $\tau 1$ of a motor associated with the first wheel leg and a target joint torque $\tau_2$ of a motor associated with the second wheel leg, that is, obtains the target joint torque $\tau_1$ of the two first motors 150 associated with the first wheel leg in FIG. 2 and the target joint torque $\tau_2$ of the two first motors 150 associated with the second wheel leg; and controls, on the basis of the target joint torque $\tau_1$, the two first motors 150 associated with the first wheel leg and controls, on the basis of the target joint torque $\tau_2$, the two first motors 150 associated with the second wheel leg, so as to control the first wheel leg and the second wheel leg to retract, thereby causing the base of the wheel-legged robot to move downwards. In an exemplary embodiment, the target joint torque $\tau_1$ is a vector including two torques. Each torque corresponds to one first motor of the first wheel leg, that is, each torque is used for controlling one first motor of the first wheel leg. The two torques are the same or different. The embodiments of this disclosure do not limit the data form of the target joint torque $\tau_1$. A data form of the target joint torque $\tau_2$ is similar to that of the target joint torque $\tau_1$, and will not be repeatedly described.

Figure 5:
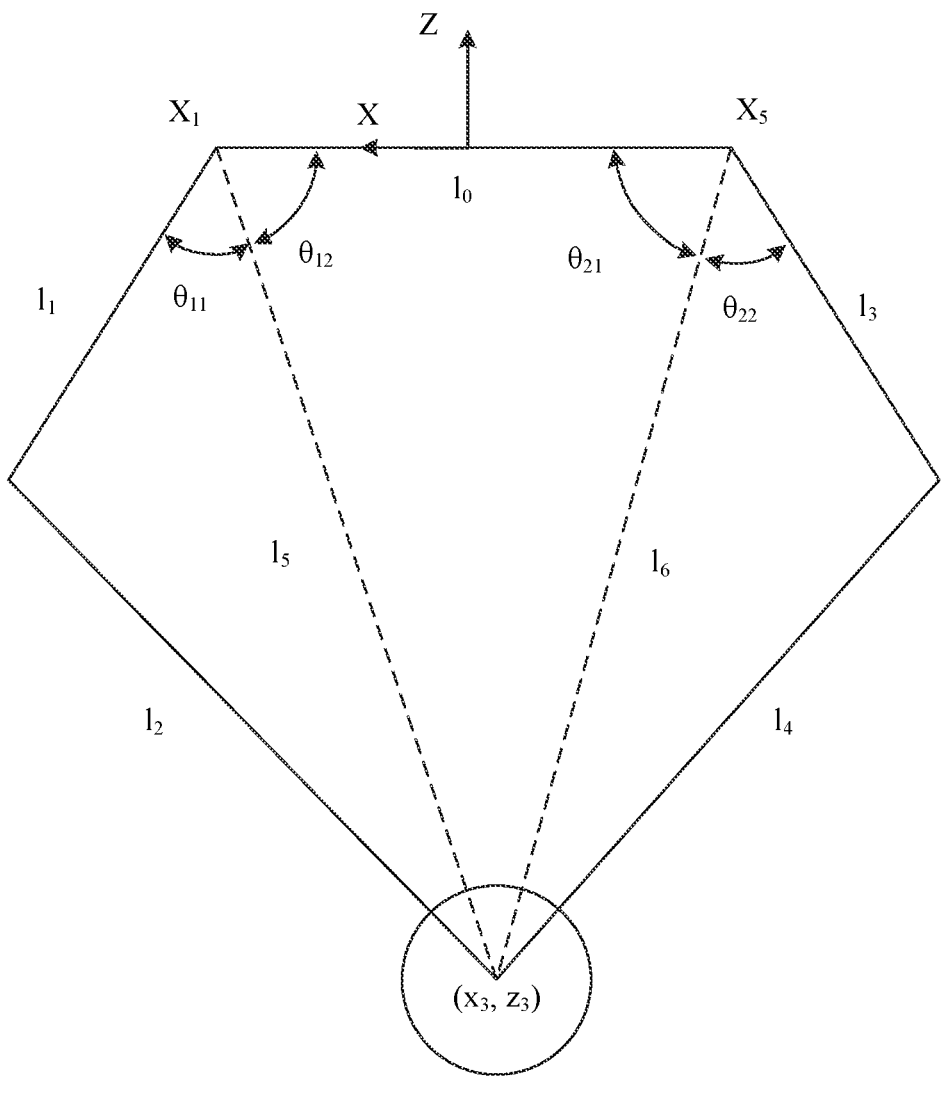
FIG. 5 is a schematic diagram of obtaining joint angle information provided according to an embodiment of this disclosure.

Exemplarily, the process of obtaining the target joint torque $\tau_1$ and the target joint torque $\tau_2$ is explained. The wheel-legged robot determines a target movement trajectory of the base on the basis of the distance between the auxiliary wheel leg and the first step. The target movement trajectory is used for describing a duration required by the base to move downwards and a position of the base at each moment during the movement of the base. The wheel-legged robot obtains, on the basis of the position of the base at each moment and the wheel leg moving direction indicated by the retraction action, the target joint torque $\tau_1$ of the motor associated with the first wheel leg at each moment and the target joint torque $\tau_2$ of the motor associated with the second wheel leg at each moment. The target joint torque $\tau_1$ and the target joint torque $\tau_2$ at any moment are used for controlling the wheel legs to retract, so that the base moves from the position of the previous moment to the position of the current moment. For example, obtaining the target joint torque $\tau_1$ of the motor associated with the first wheel leg at any moment is taken as an example. As shown in FIG. 5, a controller determines a position $X_3$ ($x_3$, $z_3$) of the wheel of the first wheel leg in a robot coordinate system on the basis of the position of the base at the current time. The robot coordinate system is an XZ coordinate system that takes the position of the base as an origin. The controller determines, on the basis of distances $l_0'$ between connecting points of the two leg structures of the first wheel leg and the base, that positions of the connecting points of the two leg structures of the first wheel leg and the base in the robot coordinate system are respectively $X_1$(0.5 $l_0'$, 0) and $X_5$(−0.5 $l_0'$, 0). The controller determines distances between the two connecting points and the wheel of the first wheel leg on the basis of the positions of the connecting points of the two leg structures and the base and the position of the wheel of the first wheel leg through formula (1). The controller determines joint angle information of the first wheel leg on the basis of the distances between the two connecting points and the wheel of the first wheel leg and sizes of the two leg structures through formula (2). The joint angle information is an angle between the first wheel leg and the base. As shown in FIG. 5, the joint angle information includes joint angle $\theta_{11}$, joint angle $\theta_{12}$, joint angle $\theta_{21}$, and joint angle $\theta_{22}$. The controller obtains, on the basis of the joint angle information, the target joint torque $\tau_1$ of the motor associated with the first wheel leg at the current moment.

$$l_5 = \sqrt{(x_3 - 0.5 l_0')^2 + z_3^2} \tag{1}$$

$$l_6 = \sqrt{(x_3 + 0.5 l_0') + z_3^2}$$

$$\theta_{11} = \arccos\left(\sqrt{\frac{l_1^2 + l_5^2 - l_2^2}{2 l_1 l_5}}\right) \tag{2}$$

$$\theta_{12} = \arccos\left(\sqrt{\frac{l_0'^2 + l_5^2 - l_6^2}{2 l_0' l_5}}\right)$$

$$\theta_{21} = \arccos\left(\sqrt{\frac{l_0'^2 + l_6^2 - l_5^2}{2 l_0' l_6}}\right)$$

$$\theta_{22} = \arccos\left(\sqrt{\frac{l_3^2 + l_6^2 - l_4^2}{2 l_3 l_6}}\right)$$

where $l_5$ and $l_6$ represent the distances between the connection points of the two leg structures of the first wheel leg and the base, respectively; $l_1$ and $l_3$ represent the sizes of the thigh structures in the two leg structures, respectively; and $l_2$ and $l_4$ represent the sizes of the lower leg structures in the two leg structures.

In an exemplary embodiment, the wheel-legged robot adjusts an angle between the auxiliary wheel leg and the base by controlling the motor associated with the auxiliary wheel leg, that is, the third motor 170 in FIG. 2, thereby controlling the projection point of the center of mass of the wheel-legged robot on the step to be within the triangular range formed by the step contact points of the three wheel legs.

In some embodiments, the wheel-legged robot first controls the wheel-legged robot to move forwards on the first step to make the first wheel leg and the second wheel leg move to a junction between the first step and the second step, and then controls the base of the wheel-legged robot to move downwards. By making the first wheel leg and the second wheel leg to the junction between the first step and the second step, a distance that the first wheel leg and the second wheel leg need to move to go upstairs is reduced, so that the wheel-legged robot can better complete the action of going upstairs.

Exemplarily, the process of controlling the wheel-legged robot to move forwards on the first step will be explained. The wheel-legged robot obtains distance between the wheels of both the first wheel leg and the second wheel leg and a step junction, and obtains reference rotational speed of the two wheels; obtains, on the basis of the obtained distance and the reference rotational speeds, torques for controlling the two wheels; and controls the motors of the two wheels on the basis of the torques of the two wheels, that is, controls the two second motors 160 in FIG. 2, so that the two wheels rotate, and the wheel-legged robot moves forwards on the first step. In an exemplary embodiment, the wheel-legged robot randomly determines the reference rotational speeds of the two wheels, or a skilled person sends to the wheel-legged robot a control command for a moving speed of the robot through a control device. The wheel-legged robot receives the control command and obtains the reference rotational speeds of the two wheels on the basis of radiuses of the two wheels and the moving speed carried in the control command.

Figure 6:
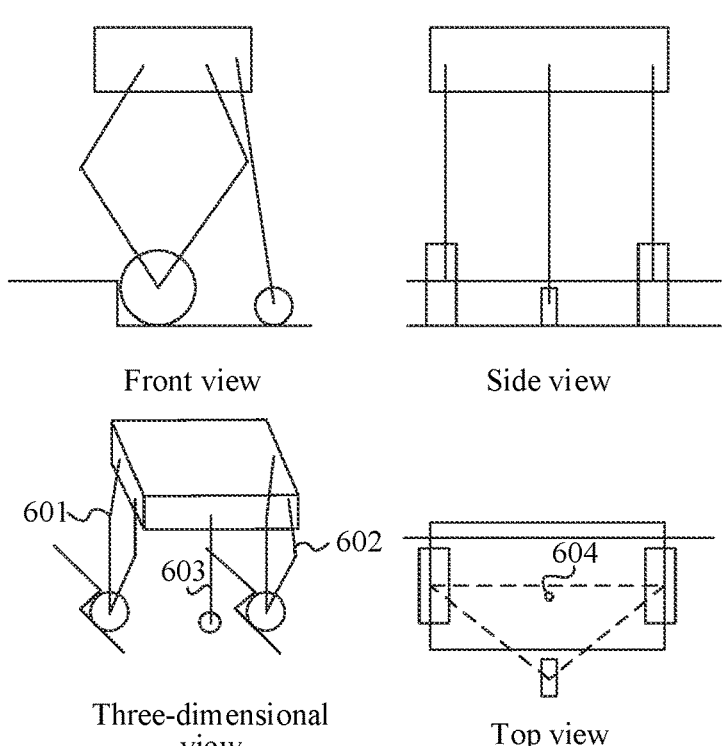
FIG. 6 is a schematic diagram of a posture of a wheel-legged robot on a first step provided according to an embodiment of this disclosure.

Exemplarily, FIG. 6 shows images and three-dimensional views of the wheel-legged robot on the first step in three viewing angles. As shown in FIG. 6, the wheel-legged robot keeps balance on the first step through the three wheel legs. The first wheel leg 601 and the second wheel leg 602 are located at the step junction. The auxiliary wheel leg 603 is located on the first step. A projection point 604 of a center of mass of the wheel-legged robot on the step is within a triangle composed of step contact points of the three wheel legs.

402: The wheel-legged robot controls the first wheel leg to move from the first step onto the second step, and controls the second wheel leg and the auxiliary wheel leg to be stabilized on the first step, a height difference existing between the first step and the second step.

In some embodiments, the process of controlling the first wheel leg to move to the second step includes the following: The wheel-legged robot first controls the first wheel leg to be lifted and then controls, within a time period when the first wheel leg leaves the first step and does not contact the second step, the first wheel leg to move towards the second step, so that the first wheel leg moves onto the second step in a case of falling. The above process will be explained below through step 402A to step 402B.

402A: The wheel-legged robot controls the first wheel leg to pedal on the ground to make the first wheel leg leave the first step.

In some embodiments, the wheel-legged robot obtains, on the basis of the height difference between the first step and the second step and a wheel leg moving direction indicated by the pedaling action, a target joint torque $\tau_3$ of a motor associated with the first wheel leg, that is, obtains the target joint torque $\tau_3$ of the two first motors 150 associated with the first wheel leg in FIG. 2, and controls, on the basis of the target joint torque $\tau_3$, the first wheel leg to pedal on the ground to lift up the first wheel leg on the basis of a reacting force of the first step. A data form of the target joint torque $\tau_3$ is similar to that of the target joint torque $\tau_1$ in step 401, and will not be repeatedly described.

Exemplarily, the process of obtaining the target joint torque $\tau_3$ will be explained. The controller obtains, on the basis of the height difference between the first step and the second step, a target angle at which one side, connected to the first wheel leg, of the base needs to be lifted; determines, on the basis of the target angle, an initial acceleration of the first wheel leg for leaving the first step and a reacting force required by the first wheel leg to leave the first step; and obtains, on the basis of the initial acceleration, the reacting force, and the wheel leg moving direction indicated by the pedaling action, the target joint torque $\tau_3$ of the motor associated with the first wheel leg.

Figure 7:
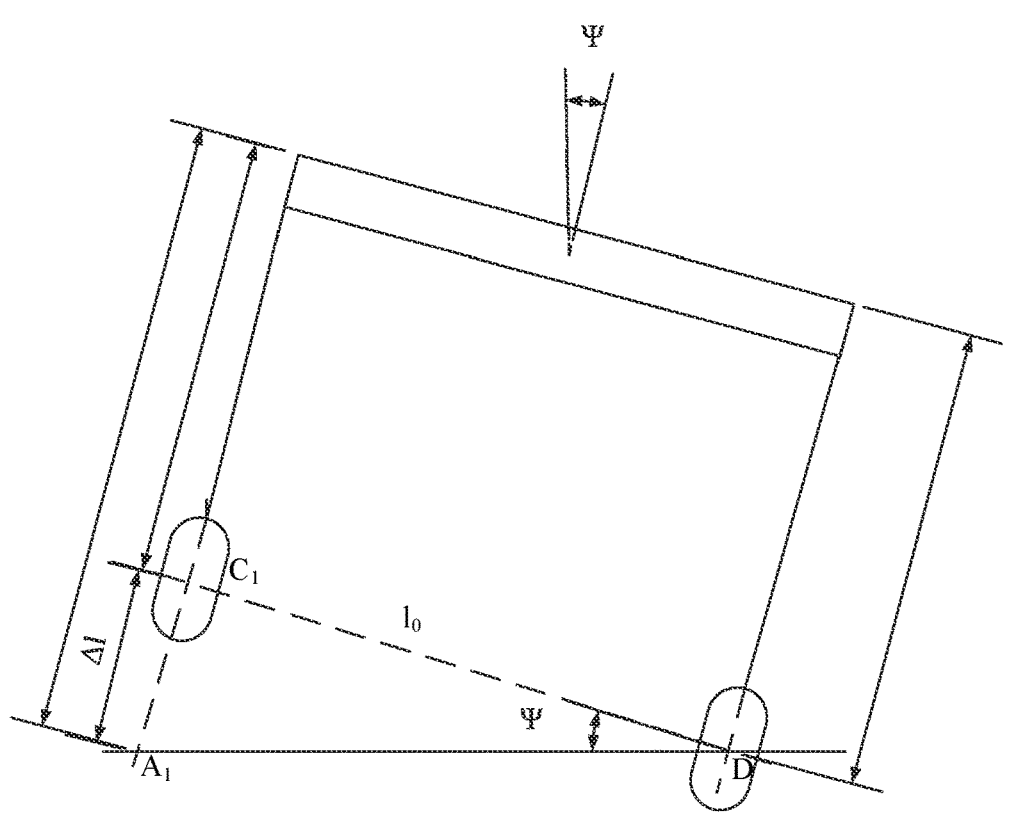
FIG. 7 is a schematic diagram of a lifting height of a wheel leg provided according to an embodiment of this disclosure.

Exemplarily, the process of obtaining the initial acceleration and the reacting force on the basis of the target angle will be explained. As shown in FIG. 7, the controller determines, on the basis of the target angle, a height $\Delta l$ at which the first wheel leg needs to be lifted using formula (3), and determines the initial acceleration and the reacting force on the basis of the height at which the first wheel leg needs to be lifted.

$$\Delta l = l_0 \tan \varphi_{ref} \tag{3}$$

where $l_0$ represents a distance between the wheels of both the first wheel leg and the second wheel leg, and $\varphi_{ref}$ represents the target angle.

402B: The wheel-legged robot controls, within the time period when the first wheel leg leaves the first step and does not contact the second step, the first wheel leg to move towards the second step, so that the first wheel leg moves onto the second step in a case of falling.

In some embodiments, within the time period when the first wheel leg leaves the first step and does not contact the second step, the wheel-legged robot controls the first wheel leg to retract a first distance and controls the first wheel leg to swing a second distance towards the second step, so that the first wheel leg moves onto the second step. The first distance is greater than the distance difference between the first step and the second step; and the second distance is greater than the radius of the wheel of the first wheel leg and less than a width of the second step.

Exemplarily, the process of controlling the first wheel leg to retract the first distance will be explained. The wheel-legged robot obtains, on the basis of the first distance and a wheel leg moving direction indicated by the retraction action, a first joint torque of the motor associated with the first wheel leg, that is, obtains the first joint torque of the two first motors 150 associated with the first wheel leg in FIG. 2, and controls, on the basis of the first joint torque, the first wheel leg to retract the first distance.

Exemplarily, the process of controlling the first wheel leg to swing the second distance towards the second step will be explained. The wheel-legged robot determines, on the basis of the second distance and a wheel leg moving direction indicated by the swing towards the second step, a second joint torque of the motor associated with the first wheel leg, that is, obtains the second joint torque of the two first motors 150 associated with the first wheel leg in FIG. 2, and controls, on the basis of the second joint torque, the first wheel leg to swing the second distance towards the second step.

The process of obtaining the first joint torque on the basis of the first distance and the process of obtaining the second joint torque on the basis of the second distance are the same as the process corresponding to FIG. 5 in step 401, and will not be repeatedly described here. Data forms of the first joint torque and the second joint torque are the same as that of the target joint torque $\tau_1$ in step 401, and will not be repeatedly described here.

Figure 8:
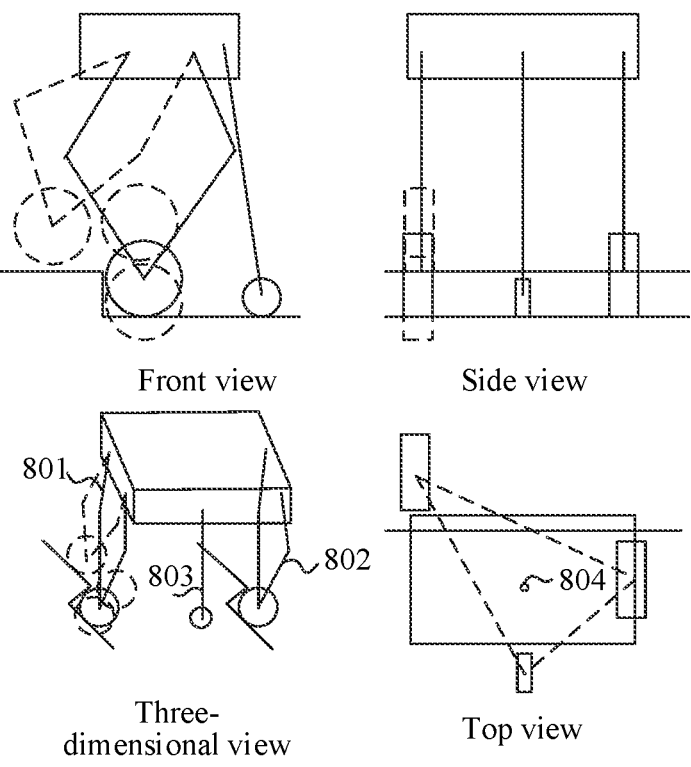
FIG. 8 is a schematic diagram of moving a first wheel leg provided according to an embodiment of this disclosure.

Exemplarily, FIG. 8 shows images and three-dimensional views of the wheel-legged robot in the moving process of the first wheel leg in three viewing angles. Solid lines and dashed lines in FIG. 8 are respectively used to represent postures of the wheel-legged robot before and after the first wheel leg moves. As shown in FIG. 8, the wheel-legged robot first controls the first wheel leg 801 to pedal on the ground to lift up the first wheel leg and controls, within a time period when the first wheel leg does not contact the step, the first wheel leg to retract and swing towards the second step, so that the first wheel leg moves onto the second step in case of falling. In this process, the second wheel leg 802 and the auxiliary wheel leg 803 are kept being stabilized on the first step. After the first wheel leg moves to the second step, a projection point 804 of a center of mass of the wheel-legged robot on the step is within a triangular range composed of the step contact points of the three wheel legs, so that the wheel-legged robot can be kept balance.

403: The wheel-legged robot controls the base of the wheel-legged robot to move towards the second step to make a projection point of a center of mass of the wheel-legged robot on the step move from the first step to the second step.

In some embodiments, the wheel-legged robot determines, on the basis of a current position of the center of mass of the wheel-legged robot, a distance that the base needs to move towards the second step; obtains, on the basis of a distance that the base needs to move towards the second step, a joint torque for controlling the base to move; and controls the two first motors 150 of the first wheel leg and the two first motors 150 of the second wheel leg in FIG. 2 on the basis of the obtained joint torque, so that the base moves towards the second step while the wheels of both the first wheel leg and the second wheel leg remain stationary. By controlling the base to move towards the second step, the center of mass of the wheel-legged robot moves to a position above the second step, so that in the subsequent step of controlling the second wheel leg to move to the second step, the wheel-legged robot can better keep balance, so as to better complete the action of going upstairs. A data format of the joint torque for controlling the first wheel leg and a data format of the joint torque for controlling the second wheel leg are the same as that of the target joint torque $\tau_1$ in step 401, and will not be repeatedly described here.

In the moving process of the base, the auxiliary wheel leg will move on the first step towards the second step along with the movement of the base. The wheel-legged robot always keeps the projection point of the center of mass of the wheel-legged robot on the step within the triangular range composed of the step contact points of the three wheel legs, so that the wheel-legged robot always keeps balance.

Figure 9:
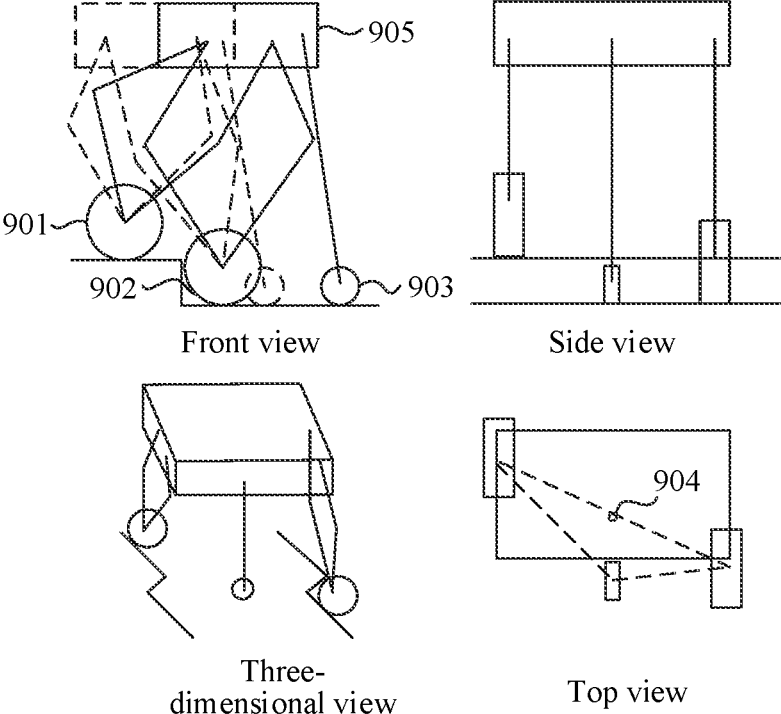
FIG. 9 is a schematic diagram of moving a base provided according to an embodiment of this disclosure.

Exemplarily, FIG. 9 shows images and three-dimensional views of the wheel-legged robot in the moving process of the base in three viewing angles. Solid lines and dashed lines in FIG. 9 are respectively used to represent postures of the wheel-legged robot before and after the base moves. As shown in FIG. 9, when the wheels of both the first wheel leg 901 and the second wheel leg 902 remain stationary, the base 905 of the wheel-legged robot is controlled to move towards the second step. Thus, a projection point 904 of a center of mass of the wheel-legged robot on the step moves to the second step. In this process, the auxiliary wheel leg 903 moves towards the second step along with the movement of the base.

404: The wheel-legged robot controls the second wheel leg to move from the first step onto the second step, controls the first wheel leg to be stabilized on the second step, and controls the auxiliary wheel leg to be stabilized on the first step.

In some embodiments, the wheel-legged robot controls, on the basis of the method that is the same as step 402, the second wheel leg to move to the second step, which will not be repeatedly described.

Figure 10:
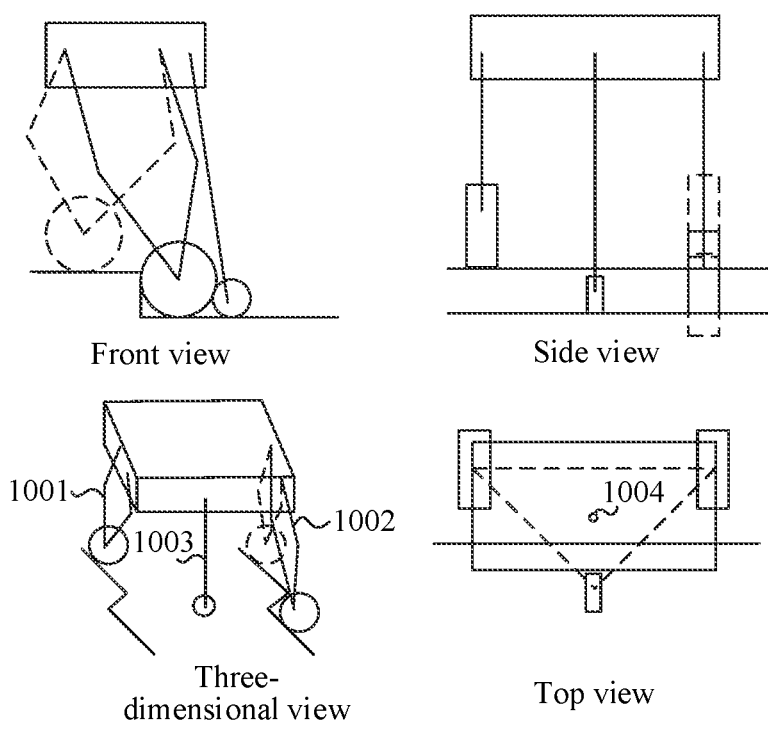
FIG. 10 is a schematic diagram of moving a second wheel leg provided according to an embodiment of this disclosure.

Exemplarily, FIG. 10 shows images and three-dimensional views of the wheel-legged robot in the moving process of the second wheel leg in three viewing angles. Solid lines and dashed lines in FIG. 10 are respectively used to represent postures of the wheel-legged robot before and after the first wheel leg moves. As shown in FIG. 10, the wheel-legged robot controls the first wheel leg 1002 to downwards pedal on the ground and controls, within a time period when the second wheel leg does not contact the step, the second wheel leg to retract and swing towards the second step, so that the second wheel leg moves onto the second step in case of falling. In this process, the first wheel leg 1001 is controlled to be stabilized on the second step, and the auxiliary wheel leg 1003 is controlled to be stabilized on the first step. After the second wheel leg moves to the second step, a projection point 1004 of a center of mass of the wheel-legged robot on the step is within a triangular range composed of the step contact points of the three wheel legs.

405: The wheel-legged robot controls the base of the wheel-legged robot to move forwards to make a projection point of a center of mass of the wheel-legged robot on the step move to a target position, the target position being as follows: a distance from a connecting line between the target position and a step contact point of the first wheel leg to a connecting line between the target position and a step contact point of the second wheel leg is less than a distance threshold, and the target position is within a triangular range composed of the step contact point of the first wheel leg, the step contact point of the second wheel leg, and a step contact point of the auxiliary wheel leg.

In some embodiments, the wheel-legged robot controls, on the basis of the method that is the same as step 403, the base to move forwards, which will not be repeatedly described. Since the projection point of the center of mass of the wheel-legged robot on the step moves to the target position, the center of mass of the wheel-legged robot further moves forwards. Thus, in the subsequent steps, the difficulty of keeping balance of the wheel-legged robot on the second step by the two wheel legs is lowered, and wheel-legged robot can better complete the action of going upstairs.

In the forwards moving process of the base, the auxiliary wheel leg moves forwards on the first step along with the movement of the base.

Figure 11:
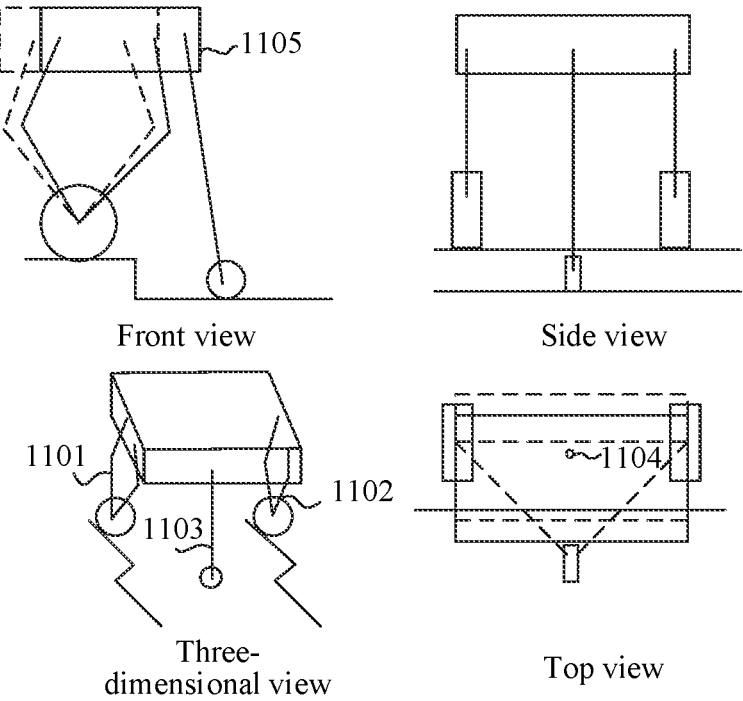
FIG. 11 is a schematic diagram of moving a base provided according to an embodiment of this disclosure.

Exemplarily, FIG. 11 shows images and three-dimensional views of the wheel-legged robot in the moving process of the base in three viewing angles. Solid lines and dashed lines in FIG. 11 are respectively used to represent postures of the wheel-legged robot before and after the base moves. As shown in FIG. 11, when the wheels of both the first wheel leg 1101 and the second wheel leg 1102 remain stationary, the wheel-legged robot controls the base 1105 to move forwards. Thus, a projection point 1104 of a center of mass of the wheel-legged robot on the step moves to the target position. In the forwards moving process of the base, the auxiliary wheel leg 1103 moves forwards on the first step along with the movement of the base.

In some embodiments, the wheel-legged robot first controls the wheel-legged robot to move forwards a target distance on the second step. The target distance is less than a distance between the step contact point of the second wheel leg and a junction of the second step and a third step. A height difference exists between the third step and the second step. The wheel-legged robot then controls the base to move forwards, so that a projection point of a center of mass of the wheel-legged robot on the step moves to the target position. By controlling the wheel-legged robot to move forwards the target distance, the distance between the first wheel leg and the junction of the first step and the second step, as well as the distance between the second wheel leg and the junction are increased, which can avoid a situation that the wheel-legged robot falls back from the second step to the first step when it keeps balance through the first wheel leg and the second wheel leg in the subsequent steps, so that the wheel-legged robot can better complete the action of going upstairs.

406: The wheel-legged robot controls the wheel-legged robot to keep balance on the second step by taking the first wheel leg and the second wheel leg as supports.

Figure 12:
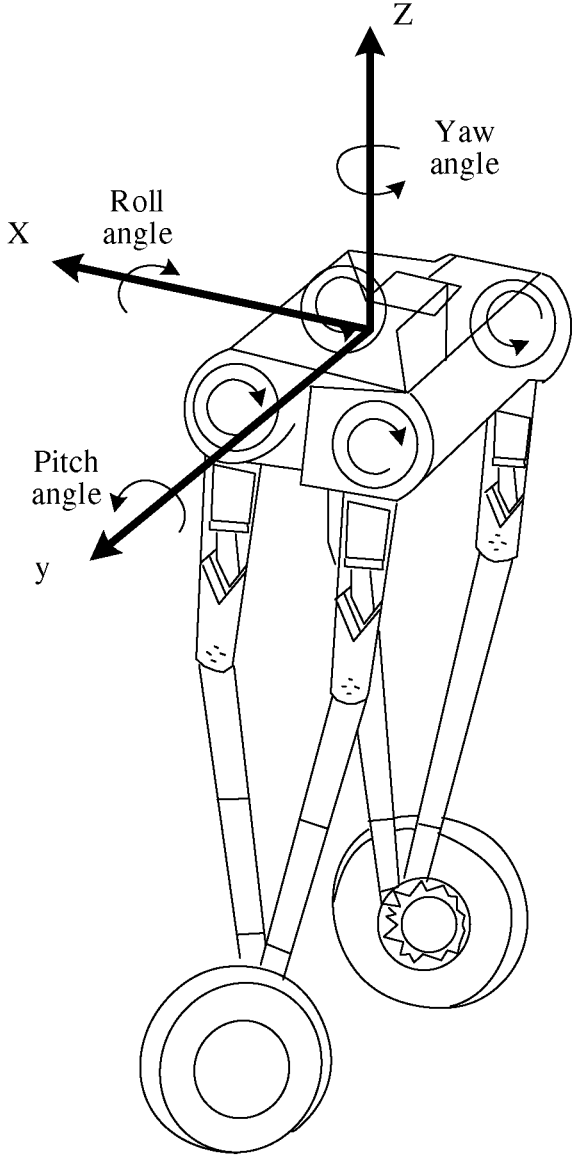
FIG. 12 is a schematic diagram of a space angle provided according to an embodiment of this disclosure.

In some embodiments, the wheel-legged robot taking the first wheel leg and the second wheel leg as the supports keeps balance by controlling three space angles of the wheel-legged robot. The three space angles are a pitch angle, a roll angle, and a yaw angle. Exemplarily, FIG. 12 is a schematic diagram of a space angle provided by this disclosure. FIG. 12 shows a right hand side cartesian coordinate system built on the basis of a center of the base, where an X-axis is a coordinate axis along a forwarding direction of the wheel-legged robot, corresponding to the roll angle. That is, an angle of the wheel-legged robot in an X-axis direction is referred to as the roll angle. A Y-axis is a coordinate axis in a two-wheel connecting direction of the wheel-legged robot, corresponding to the pitch angle. That is, an angle in a Y-axis direction of the wheel-legged robot is referred to as the pitch angle. A Z-axis is a coordinate axis in a vertically upward direction, corresponding to the yaw angle. That is, an angle in a Z-axis direction of the wheel-legged robot is referred to as the yaw angle.

Figure 13:
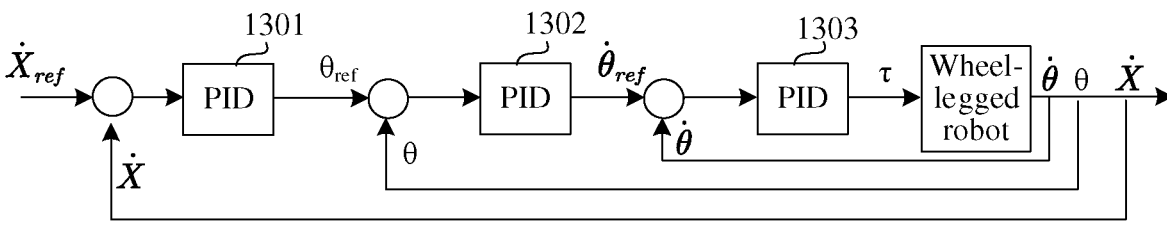
FIG. 13 is a schematic diagram of controlling a pitch angle to be balanced provided according to an embodiment of this disclosure.

Exemplarily, the method for controlling the pitch angle will be described. As shown in FIG. 13, the wheel-legged robot first obtains reference moving speeds $\dot{X}_{ref}$ and current moving speeds $\dot{X}$ of centers of the wheels of both the first wheel leg and the second wheel leg. The reference moving speed is a moving speed that the center of the wheel needs to achieve on the basis of a motion state of the wheel-legged robot. For example, if the wheel-legged robot needs to remain stationary in a balanced state, the reference moving speed is 0. The wheel-legged robot inputs a difference value between $\dot{X}_{ref}$ and $\dot{X}$ to a Proportional-integral-differential (PID) controller 1301 to obtain a reference pitch angle $\theta_{ref}$ of the wheel-legged robot. The wheel-legged robot then obtains a current pitch angle $\theta$ of the wheel-legged robot and inputs a difference value between $\theta_{ref}$ and $\theta$ to a PID controller 1302 to obtain a reference pitch angle speed $\dot{\theta}_{ref}$. The wheel-legged robot obtains a current pitch angle speed $\dot{\theta}$ of the wheel-legged robot and inputs a difference value between $\dot{\theta}_{ref}$ and $\dot{\theta}$ to a PID controller 1303 to obtain a torque for controlling pitch angle balance. The second motors of the two wheels are controlled on the basis of the obtained torque, thereby controlling pitch angle balance of the wheel-legged robot. In an exemplary embodiment, $\dot{X}\theta$, and $\dot{\theta}$ are obtained on the basis of a posture sensor of the wheel-legged robot.

Figure 14:
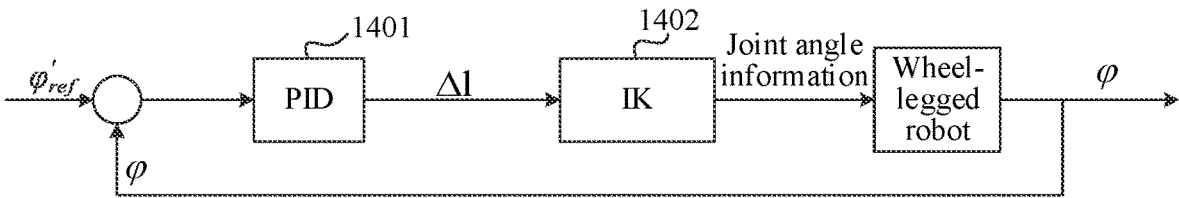
FIG. 14 is a schematic diagram of controlling a roll angle to be balanced provided according to an embodiment of this disclosure.

Exemplarily, the method for controlling the roll angle will be explained. As shown in FIG. 14, the wheel-legged robot obtains a reference roll angle $\varphi_{ref}$ and a current roll angle $\varphi$ of the wheel-legged robot. In an exemplary embodiment, in a case of not receiving a roll angle control command, the wheel-legged robot obtains the reference roll angle as 0°. In a case of receiving a roll angle control command, the roll angle carried in the roll angle control command is obtained as the reference roll angle. In an exemplary embodiment, the wheel-legged robot obtains the current roll angle on the basis of a posture sensor. The wheel-legged robot inputs a difference value between $\varphi_{ref}'$ and $\varphi$ to a PID controller 1401 to obtain a distance $\Delta l'$ that the first wheel leg and the second wheel leg need to extend and retract, and inputs $\Delta l'$ to an inverse kinematics solver (IK) 1402 to obtain joint angle information of the first wheel leg and the second wheel leg. A torque for controlling roll angle balance is obtained on the basis of the joint angle information. The two first motors of the first wheel leg and the two first motors of the second wheel leg are controlled on the basis of the obtained torque, thereby controlling roll angle balance of the wheel-legged robot. By using the method shown in FIG. 14, it is possible to control the wheel-legged robot to be balanced in a roll angle direction when there is no degree of freedom in a roll direction between the wheel legs and the base, that is, when the wheel legs cannot swing left and right relative to the base. A data format of the torque for controlling the first wheel leg and a data format of the torque for controlling the second wheel leg are the same as that of the target joint torque $\tau_1$ in step 401, and will not be repeatedly described here.

Exemplarily, the method for controlling the yaw angle will be described. The wheel-legged robot obtains a reference yaw angle $\phi_{ref}$ and a current yaw angle $\phi$ of the wheel-legged robot. In an exemplary embodiment, in a case of not receiving a yaw angle control command, the wheel-legged robot obtains the reference yaw angle as 0°. In a case of receiving a yaw angle control command, the yaw angle carried in the yaw angle control command is obtained as the reference yaw angle. In an exemplary embodiment, the wheel-legged robot obtains the current roll angle on the basis of a posture sensor. The wheel-legged robot obtains a reference moving speed $\dot{X}_1$ of the center of the wheel of the first wheel leg and a reference moving speed $\dot{X}_2$ of the center of the wheel of the second wheel leg on the basis of a difference value between $\phi_{ref}$ and $\phi$; obtains reference rotational speeds of the two wheels on the basis of $\dot{X}_1$, $\dot{X}_2$, and radiuses of the wheels, obtains, on the basis of the reference rotational speeds, a torque for controlling yaw angle balance of the two wheels, and controls the second motors of the two wheels on the basis of the obtained torque, thereby controlling yaw angle balance of the wheel-legged robot.

After the wheel-legged robot keeps balance on the second step by taking the first wheel leg and the second wheel leg as the supports, although the auxiliary wheel leg still contacts the first step, an acting force between the auxiliary wheel leg and the first step approaches 0, that is, the wheel-legged robot no longer keeps balance by taking the auxiliary wheel leg as the support, which lays a good foundation for moving the auxiliary wheel leg onto the second step in the subsequent steps.

407: The wheel-legged robot controls the auxiliary wheel leg to move from the first step onto the second step, and controls the first wheel leg and the second wheel leg to be stabilized on the second step.

In some embodiments, the process of controlling the auxiliary wheel leg to move onto the second step includes the following. The wheel-legged robot controls the base of the wheel-legged robot to move upwards a third distance, the third distance being greater than or equal to the height difference between the first step and the second step; and controls the wheel-legged robot to move forwards on the second step to make the auxiliary wheel leg connected to the base move onto the second step.

In an exemplary embodiment, the wheel-legged robot records an initial height of the wheel-legged robot. The initial height is a distance between the base and the first step when the wheel-legged robot keeps balance on the first step by the three wheel legs. Correspondingly, the third distance is also a height difference between a current height of the wheel-legged robot and the initial height of the wheel-legged robot. The third distance is obtained through the initial height, so that a height of the wheel-legged robot remains consistent with the initial height after the base moves upwards the third distance, so that the wheel-legged robot can better perform the action of going upstairs in the next time.

Exemplarily, the process of controlling the base to move upwards the third distance will be explained. The controller obtains, on the basis of the third distance and a wheel leg moving direction indicated by the extension action, a third joint torque of the motor associated with the first wheel leg and a fourth joint torque of the motor associated with the second wheel leg, that is, obtains the third joint torque of the two first motors 150 associated with the first wheel leg in FIG. 2 and the fourth joint torque of the two first motors 150 associated with the second wheel leg in FIG. 2, and controls, on the basis of the third joint torque and the fourth joint torque, the first wheel leg and the second wheel leg to extend the third distance to make the base move upwards the third distance. The process of obtaining the third joint torque and the fourth joint torque on the basis of the third distance is the same as the process corresponding to FIG. 5 in step 401, and will not be repeatedly described here. Data forms of the third joint torque and the fourth joint torque are the same as that of the target joint torque $\tau_1$ in step 401, and will not be repeatedly described here.

Figure 15:
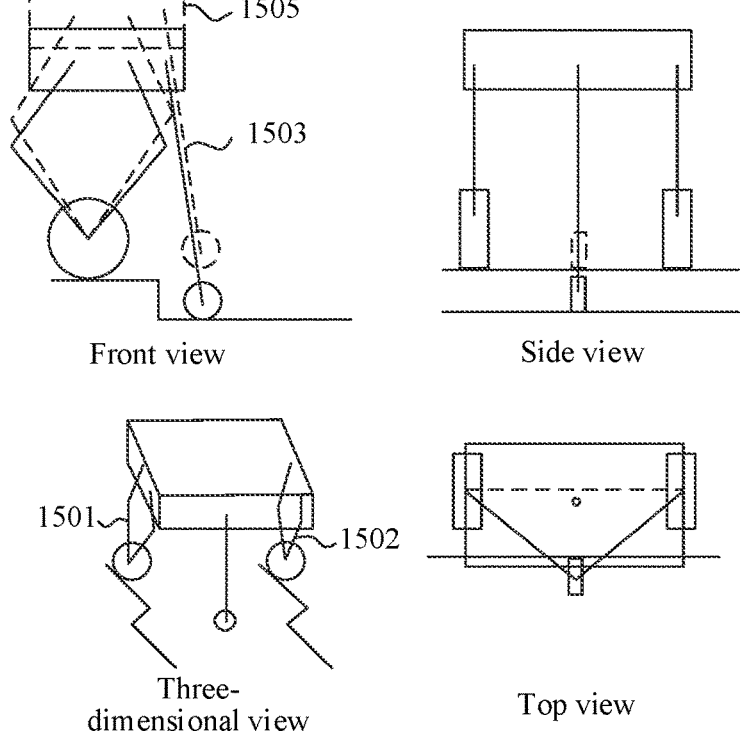
FIG. 15 is a schematic diagram of moving a base provided according to an embodiment of this disclosure.

Exemplarily, FIG. 15 shows images and three-dimensional views of the wheel-legged robot in the process that the base moves upwards the third distance in three viewing angles. As shown in FIG. 15, the wheel-legged robot controls the base 1505 to move upwards the third distance, so that the auxiliary wheel leg 1503 leaves the first step. In this process, the wheel-legged robot controls the first wheel leg 1501 and the second wheel leg 1502 to remain stable on the second step.

In the process of controlling the auxiliary wheel leg to be lifted up and move from the first step onto the second step, the posture of the wheel-legged robot changes, so that the position of the center of mass of the wheel-legged robot also changes. In order to keep the balance of the wheel-legged robot in the pitch angle direction, the wheel-legged robot obtains the position of the center of mass of the wheel-legged robot in real time, obtains, on the basis of the position of the center of mass of the wheel-legged robot and the PID controller 1301, the PID controller 1302 and the PID controller 1303 in step 406, a torque for controlling pitch angle balance, and controls the second motors of the two wheels on the basis of the obtained torque, thereby keeping the balance of the wheel-legged robot in a pitch angle direction.

According to the technical solutions provided by the embodiments of this disclosure, the first wheel leg, the second wheel leg, and the auxiliary wheel leg are controlled to move from the first step to the second step in sequence, and the other two wheel legs are controlled to be stabilized on the step when moving any wheel leg, so that in a case of ensuring the balance of the wheel-legged robot, the function of the wheel-legged robot for going upstairs is realized, the diversity of actions and functions of the wheel-legged robot is improved, and the adaptability of the wheel-legged robot to the ground is also improved.

Figure 16:
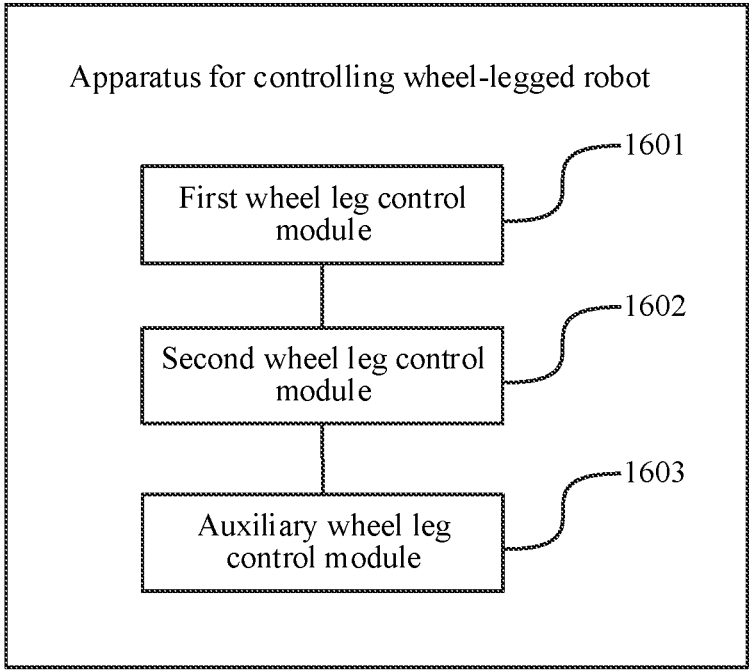
FIG. 16 is a schematic structural diagram of an apparatus for controlling a wheel-legged robot provided according to an embodiment of this disclosure.

FIG. 16 is a schematic structural diagram of an apparatus for controlling a wheel-legged robot provided according to an embodiment of this disclosure. As shown in FIG. 16, the apparatus includes: a first wheel leg control module 1601, a second wheel leg control module 1602, and an auxiliary wheel leg control module 1603.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

The first wheel leg control module 1601 is configured to: control the first wheel leg to move from a first step onto a second step, and control the second wheel leg and the auxiliary wheel leg to be stabilized on the first step, a height difference existing between the first step and the second step;

the second wheel leg control module 1602 is configured to: control the second wheel leg to move from the first step onto the second step, control the first wheel leg to be stabilized on the second step, and control the auxiliary wheel leg to be stabilized on the first step; and the auxiliary wheel leg control module 1603 is configured to: control the auxiliary wheel leg to move from the first step onto the second step, and controlling the first wheel leg and the second wheel leg to be stabilized on the second step.

In some embodiments, the first wheel leg control module 1601 includes:

a first control sub-module, configured to control the first wheel leg to pedal on the ground to make the first wheel leg leave the first step; and a second control sub-module, configured to control, within a time period when the first wheel leg leaves the first step and does not contact the second step, the first wheel leg to move towards the second step, so that the first wheel leg moves onto the second step in a case of falling.

In some embodiments, the first control sub-module includes:

an obtaining unit, configured to obtain, on the basis of the height difference between the first step and the second step and a wheel leg moving direction indicated by the pedaling action, a target joint torque of a motor associated with the first wheel leg; and a control unit, configured to control, on the basis of the target joint torque, the first wheel leg to pedal on the ground to lift up the first wheel leg on the basis of a reacting force of the first step.

In some embodiments, the wheel-legged robot further includes a base; the base is located above the first wheel leg, the second wheel leg, and the auxiliary wheel leg and is connected to the first wheel leg, the second wheel leg, and the auxiliary wheel leg.

The obtaining unit is configured to obtain, on the basis of the height difference between the first step and the second step, a target angle at which one side, connected to the first wheel leg, of the base needs to be lifted; determine, on the basis of the target angle, an initial acceleration of the first wheel leg for leaving the first step and a reacting force required by the first wheel leg to leave the first step; and obtain, on the basis of the initial acceleration, the reacting force, and the wheel leg moving direction indicated by the pedaling action, the target joint torque of the motor associated with the first wheel leg.

In some embodiments, the second control sub-module is configured to: control, within the time period when the first wheel leg leaves the first step and does not contact the second step, the first wheel leg to retract a first distance and control the first wheel leg to swing a second distance towards the second step. The first distance is greater than the distance difference between the first step and the second step; and the second distance is greater than the radius of the wheel of the first wheel leg and less than a width of the second step.

In some embodiments, the second control sub-module is configured to: obtain, on the basis of the first distance and a wheel leg moving direction indicated by the retraction action, a first joint torque of the motor associated with the first wheel leg; and control, on the basis of the first joint torque, the first wheel leg to retract the first distance.

In some embodiments, the second control sub-module is configured to: determine, on the basis of the second distance and a wheel leg moving direction indicated by the swing towards the second step, a second joint torque of the motor associated with the first wheel leg; and control, on the basis of the second joint torque, the first wheel leg to swing the second distance towards the second step.

In some embodiments, the wheel-legged robot further includes a base; the base is located above the first wheel leg, the second wheel leg, and the auxiliary wheel leg and is connected to the first wheel leg, the second wheel leg, and the auxiliary wheel leg.

The auxiliary wheel leg control module 1603 includes:

a third control sub-module, configured to control the base of the wheel-legged robot to move upwards a third distance, the third distance being greater than or equal to the height difference between the first step and the second step; and a fourth control sub-module, configured to control the wheel-legged robot to move forwards on the second step to make the auxiliary wheel leg connected to the base move onto the second step.

In some embodiments, the third control sub-module is configured to: obtain, on the basis of the third distance and a wheel leg moving direction indicated by the extension action, a third joint torque of the motor associated with the first wheel leg and a fourth joint torque of the motor associated with the second wheel leg; and control, on the basis of the third joint torque and the fourth joint torque, the first wheel leg and the second wheel leg to extend the third distance to make the base move upwards the third distance.

In some implementations, the apparatus further includes:

a first balance control module, configured to control the wheel-legged robot to keep balance on the first step by taking the first wheel leg, the second wheel leg, and the auxiliary wheel leg as supports.

In some embodiments, the wheel-legged robot further includes a base; the base is located above the first wheel leg, the second wheel leg, and the auxiliary wheel leg and is connected to the first wheel leg, the second wheel leg, and the auxiliary wheel leg.

The first balance control module is configured to: control the base of the wheel-legged robot to move downwards to make the auxiliary wheel leg connected to the base contact the first step; and control a projection point of a center of mass of the wheel-legged robot on the step to be within a triangular range composed of a step contact point of the first wheel leg, a step contact point of the second wheel leg, and a step contact point of the auxiliary wheel leg.

In some embodiments, the first balance control module is further configured to control the wheel-legged robot to move forwards on the first step to make the first wheel leg and the second wheel leg move to a junction between the first step and the second step.

In some embodiments, the wheel-legged robot further includes a base; the base is located above the first wheel leg, the second wheel leg, and the auxiliary wheel leg and is connected to the first wheel leg, the second wheel leg, and the auxiliary wheel leg.

The apparatus further includes:

a base control module, configured to control the base of the wheel-legged robot to move towards the second step to make a projection point of a center of mass of the wheel-legged robot on the step move from the first step to the second step.

In some implementations, the apparatus further includes:

a second balance control module, configured to control the wheel-legged robot to keep balance on the second step by taking the first wheel leg and the second wheel leg as supports.

In some embodiments, the wheel-legged robot further includes a base; the base is located above the first wheel leg, the second wheel leg, and the auxiliary wheel leg and is connected to the first wheel leg, the second wheel leg, and the auxiliary wheel leg.

The apparatus further includes:

a base control module, configured to control the base of the wheel-legged robot to move forwards to make a projection point of a center of mass of the wheel-legged robot on the step move to a target position, the target position being as follows: a distance from a connecting line between the target position and a step contact point of the first wheel leg to a connecting line between the target position and a step contact point of the second wheel leg is less than a distance threshold, and the target position is within a triangular range composed of the step contact point of the first wheel leg, the step contact point of the second wheel leg, and a step contact point of the auxiliary wheel leg.

When the apparatus for controlling the wheel-legged robot provided according to the above embodiments controls the wheel-legged robot, only an example of division of the foregoing functional modules is described. In practical application, the foregoing functions are allocated to and completed by different functional modules as required, that is, an inner structure of the apparatus is divided into different functional modules, so as to complete all or some of the functions described above. In addition, the apparatus for controlling the wheel-legged robot provided in the above embodiments and the method for controlling the wheel-legged robot provided in the above embodiments belong to the same concept. For the specific implementation process, refer to the method embodiments.

Figure 17:
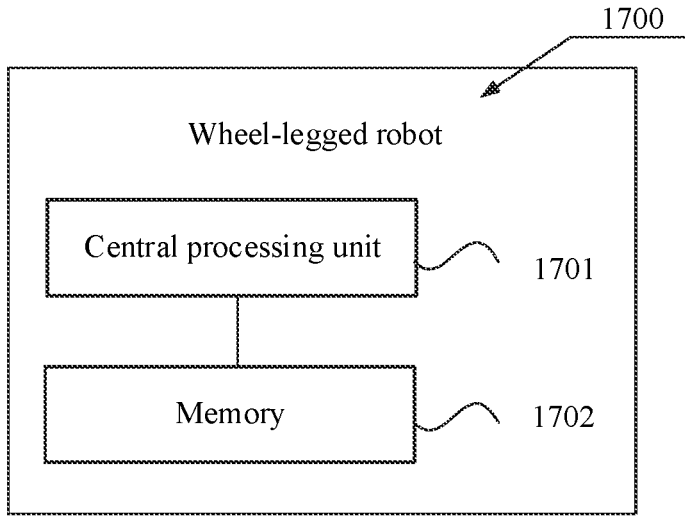
FIG. 17 is a schematic structural diagram of a wheel-legged robot provided according to an embodiment of this disclosure.

The embodiments of the present disclosure provide a wheel-legged robot configured to perform the method for controlling the wheel-legged robot. FIG. 17 is a schematic structural diagram of a wheel-legged robot provided according to an embodiment of this disclosure. The wheel-legged robot 1700 may vary a lot due to different configurations or performance, and may include one or more central processing units (CPUs) 1701 and one or more memories 1702. The one or more memories 1702 store at least one program code, and the at least one program code is loaded and executed by the one or more CPUs 1701 to implement the methods provided in all the above method embodiments. Of course, the wheel-legged robot 1700 may further include components such as a wired or wireless network interface, a keyboard, and an input/output interface, to facilitate inputting and outputting. The wheel-legged robot 1700 may further include another component configured to implement a function of a device. Details refer to the embodiments described herein.

In an exemplary embodiment, a computer-readable storage medium is further provided, such as a memory including at least one program code, and the at least one program code may be executed by a CPU to complete the method for controlling the wheel-legged robot in the above embodiments. For example, the computer-readable storage medium may be a read-only memory (ROM), a Random Access Memory (RAM), a compact disc ROM (CD-ROM), a magnetic tape, a floppy disk, an optical data storage device, or the like.

In an exemplary embodiment, a computer program product is further provided. The computer program product including at least one computer program, and the at least one computer program is stored in a computer-readable storage medium. A CPU of a wheel-legged robot reads the at least one computer program from the computer-readable storage medium, and the CPU executes the at least one computer program, causing the wheel-legged robot to perform operations executed in the above method for controlling the wheel-legged robot.

In some embodiments, the computer program in the embodiments of this disclosure may be deployed on a computer device for execution, or on a plurality of computer devices located at one site for execution, or on a plurality of computer devices distributed at a plurality of sites and interconnected by a communication network for execution, and the plurality of computer devices distributed at the plurality of sites and interconnected by the communication network form a blockchain system.

Information (including but not limited to user device information and user personal information), data (including but not limited to data for analysis, stored data, displayed data, and the like), and signals involved in this disclosure are authorized by a user or fully authorized by all parties, and the acquisition, use, and processing of the relevant data need to comply with relevant laws, regulations, and standards of relevant countries and regions. For example, step information involved in this disclosure is obtained under full authorization.

A person of ordinary skill in the art may understand that all or some of the steps of the embodiments are implemented by hardware or a program instructing related hardware. The program is stored in a computer-readable storage medium. The storage medium includes a read-only memory, a magnetic disk, an optical disc, or the like.

The foregoing descriptions are merely optional embodiments of this disclosure, but are not intended to limit this disclosure. Any modification, equivalent replacement, or improvement made within the spirit and principle of this disclosure shall fall within the protection scope of this disclosure.

What is claimed is:

1. A method for controlling a wheel-legged robot, performed by the wheel-legged robot, the wheel-legged robot comprising a first wheel leg, a second wheel leg, and an auxiliary wheel leg, and the method comprising:

controlling the first wheel leg to move from a first step onto a second step;

controlling the second wheel leg and the auxiliary wheel leg to be stabilized on the first step, a height difference existing between the first step and the second step;

after the first wheel leg being moved onto the second step, controlling the second wheel leg to move from the first step onto the second step;

controlling the first wheel leg to be stabilized on the second step;

controlling the auxiliary wheel leg to be stabilized on the first step;

controlling the auxiliary wheel leg to move from the first step onto the second step; and controlling the first wheel leg and the second wheel leg to be stabilized on the second step.

2. The method according to claim 1, wherein the controlling the first wheel leg to move from the first step onto the second step comprises:

controlling the first wheel leg to pedal on a ground to make the first wheel leg leave the first step;

controlling, within a time period when the first wheel leg leaves the first step and does not contact the second step, the first wheel leg to move towards the second step, so that the first wheel leg moves onto the second step in case of falling.

3. The method according to claim 2, wherein the controlling the first wheel leg to tread on the ground to make the first wheel leg leave the first step comprises:

obtaining, based on a height difference between the first step and the second step and a wheel leg moving direction indicated by a pedaling action, a target joint torque of a motor associated with the first wheel leg; and controlling, based on the target joint torque, the first wheel leg to pedal on the ground to lift up the first wheel leg based on a reacting force of the first step.

4. The method according to claim 3, wherein the wheel-legged robot further comprises a base; the base is located above the first wheel leg, the second wheel leg, and the auxiliary wheel leg and is connected to the first wheel leg, the second wheel leg, and the auxiliary wheel leg, and the obtaining the target joint torque of the motor associated with the first wheel leg comprises:

obtaining, based on the height difference between the first step and the second step, a target angle at which one side, connected to the first wheel leg, of the base needs to be lifted;

determining, based on the target angle, an initial acceleration of the first wheel leg for leaving the first step and a reacting force required by the first wheel leg to leave the first step; and obtaining the target joint torque of the motor associated with the first wheel leg based on the initial acceleration, the reacting force, and the wheel leg moving direction indicated by the pedaling action.

5. The method according to claim 2, wherein the controlling the first wheel leg to move towards the second step comprises:

controlling, within the time period when the first wheel leg leaves the first step and does not contact the second step, the first wheel leg to retract a first distance, and controlling the first wheel leg to swing a second distance towards the second step, wherein the first distance is greater than a distance difference between the first step and the second step, and the second distance is greater than a radius of a wheel of the first wheel leg and less than a width of the second step.

6. The method according to claim 5, wherein the controlling the first wheel leg to retract the first distance comprises:

obtaining, based on the first distance and a wheel leg moving direction indicated by a retraction action, a first joint torque of a motor associated with the first wheel leg; and controlling, based on the first joint torque, the first wheel leg to retract the first distance.

7. The method according to claim 5, wherein the controlling the first wheel leg to swing the second distance towards the second step comprises:

determining, based on the second distance and a wheel leg moving direction indicated by the swing towards the second step, a second joint torque of a motor associated with the first wheel leg; and controlling, based on the second joint torque, the first wheel leg to swing the second distance towards the second step.

8. The method according to claim 1, wherein the wheel-legged robot further comprises a base, the base is located above the first wheel leg, the second wheel leg, and the auxiliary wheel leg and is connected to the first wheel leg, the second wheel leg, and the auxiliary wheel leg, and the controlling the auxiliary wheel leg to move from the first step onto the second step comprises:

controlling the base of the wheel-legged robot to move upwards a third distance, the third distance being greater than or equal to a height difference between the first step and the second step; and controlling the wheel-legged robot to move forwards on the second step to make the auxiliary wheel leg connected to the base move onto the second step.

9. The method according to claim 8, wherein the controlling the base of the wheel-legged robot to move upwards a third distance comprises:

obtaining, based on the third distance and a wheel leg moving direction indicated by an extension action, a third joint torque of the motor associated with the first wheel leg and a fourth joint torque of the motor associated with the second wheel leg; and controlling, based on the third joint torque and the fourth joint torque, the first wheel leg and the second wheel leg to extend the third distance to make the base move upwards the third distance.

10. The method according to claim 1, the method further comprising:

controlling the wheel-legged robot to keep balance on the first step by taking the first wheel leg, the second wheel leg, and the auxiliary wheel leg as supports.

11. The method according to claim 10, wherein the wheel-legged robot further comprises a base, the base is located above the first wheel leg, the second wheel leg, and the auxiliary wheel leg and is connected to the first wheel leg, the second wheel leg, and the auxiliary wheel leg, the controlling the wheel-legged robot to keep balance on the first step by taking the first wheel leg, the second wheel leg, and the auxiliary wheel leg as supports comprises:

controlling the base of the wheel-legged robot to move downwards to make the auxiliary wheel leg connected to the base contact the first step; and controlling a projection point of a center of mass of the wheel-legged robot on a step to be within a triangular range comprised of a step contact point of the first wheel leg, a step contact point of the second wheel leg, and a step contact point of the auxiliary wheel leg.

12. The method according to claim 11, the method further comprising:

controlling the wheel-legged robot to move forwards on the first step to make the first wheel leg and the second wheel leg move to a junction between the first step and the second step.

13. The method according to claim 1, wherein the wheel-legged robot further comprises a base, the base is located above the first wheel leg, the second wheel leg, and the auxiliary wheel leg and is connected to the first wheel leg, the second wheel leg, and the auxiliary wheel leg, and method further comprises:

controlling the base of the wheel-legged robot to move towards the second step to make a projection point of a center of mass of the wheel-legged robot on a step move from the first step to the second step.

14. The method according to claim 1, the method further comprising:

controlling the wheel-legged robot to keep balance on the second step by taking the first wheel leg and the second wheel leg as supports.

15. The method according to claim 14, wherein the wheel-legged robot further comprises a base, the base is located above the first wheel leg, the second wheel leg, and the auxiliary wheel leg and is connected to the first wheel leg, the second wheel leg, and the auxiliary wheel leg, and the method further comprises:

controlling the base of the wheel-legged robot to move forwards to make a projection point of a center of mass of the wheel-legged robot on a step move to a target position, wherein a distance from a connecting line between the target position and a step contact point of the first wheel leg to a connecting line between the target position and a step contact point of the second wheel leg is less than a distance threshold, and the target position is within a triangular range comprised of the step contact point of the first wheel leg, the step contact point of the second wheel leg, and a step contact point of the auxiliary wheel leg.

16. An apparatus for controlling a wheel-legged robot, the wheel-legged robot comprising a first wheel leg, a second wheel leg, and an auxiliary wheel leg, and the apparatus comprising:

a memory operable to store computer-readable instructions; and a processor circuitry operable to read the computer-readable instructions, the processor circuitry when executing the computer-readable instructions is configured to:

control the first wheel leg to move from a first step onto a second step;

control the second wheel leg and the auxiliary wheel leg to be stabilized on the first step, a height difference existing between the first step and the second step;

after the first wheel leg being moved onto the second step, control the second wheel leg to move from the first step onto the second step;

control the first wheel leg to be stabilized on the second step;

control the auxiliary wheel leg to be stabilized on the first step;

control the auxiliary wheel leg to move from the first step onto the second step; and control the first wheel leg and the second wheel leg to be stabilized on the second step.

17. The apparatus according to claim 16, wherein the processor circuitry is configured to:

control the first wheel leg to pedal on a ground to make the first wheel leg leave the first step; and control, within a time period when the first wheel leg leaves the first step and does not contact the second step, the first wheel leg to move towards the second step, so that the first wheel leg moves onto the second step in case of falling.

18. The apparatus according to claim 16, wherein the wheel-legged robot further comprises a base, the base is located above the first wheel leg, the second wheel leg, and the auxiliary wheel leg and is connected to the first wheel leg, the second wheel leg, and the auxiliary wheel leg, and the processor circuitry is configured to:

control the base of the wheel-legged robot to move upwards a third distance, the third distance being greater than or equal to a height difference between the first step and the second step; and control the wheel-legged robot to move forwards on the second step to make the auxiliary wheel leg connected to the base move onto the second step.

19. The apparatus according to claim 16, wherein the wheel-legged robot further comprises a base, the base is located above the first wheel leg, the second wheel leg, and the auxiliary wheel leg and is connected to the first wheel leg, the second wheel leg, and the auxiliary wheel leg, and the processor circuitry is configured to:

control the base of the wheel-legged robot to move towards the second step to make a projection point of a center of mass of the wheel-legged robot on a step move from the first step to the second step.

20. A non-transitory machine-readable media, having instructions stored on the machine-readable media to control a wheel-legged robot, the wheel-legged robot comprising a first wheel leg, a second wheel leg, and an auxiliary wheel leg, the instructions configured to, when executed, cause a machine to:

control the first wheel leg to move from a first step onto a second step;

control the second wheel leg and the auxiliary wheel leg to be stabilized on the first step, a height difference existing between the first step and the second step;

after the first wheel leg being moved onto the second step, control the second wheel leg to move from the first step onto the second step;

control the first wheel leg to be stabilized on the second step;

control the auxiliary wheel leg to be stabilized on the first step;

control the auxiliary wheel leg to move from the first step onto the second step; and control the first wheel leg and the second wheel leg to be
 stabilized on the second step.

* * * * *